United States Patent [19]
King

[11] 3,867,680
[45] Feb. 18, 1975

[54] INSTRUMENTATION SYSTEM CONTAINING A NULL SHIFTING MEANS
[75] Inventor: Paul B. King, Mountain Lakes, N.J.
[73] Assignee: The Cessna Aircraft Company, Wichita, Kans.
[22] Filed: May 22, 1973
[21] Appl. No.: 362,730

[52] U.S. Cl.................... 318/584, 73/386, 73/387, 250/204, 318/640
[51] Int. Cl............................................. B64c 13/18
[58] Field of Search .......... 318/584, 640, 480, 632; 73/386, 387; 250/204

[56] References Cited
UNITED STATES PATENTS

| | | | |
|---|---|---|---|
| 2,793,341 | 5/1957 | Waldhauer........................ | 318/584 |
| 3,100,858 | 8/1963 | Topazio et al.................. | 318/489 X |
| 3,535,607 | 10/1970 | Haslehurst...................... | 318/640 X |
| 3,705,987 | 12/1972 | Clarke et al.................... | 318/640 X |

Primary Examiner—B. Dobeck
Attorney, Agent, or Firm—Browne, Beveridge, DeGrandi & Kline

[57] ABSTRACT

An instrument has a parameter indicator graduated in units which are a non-proportional function of movement produced by a parameter sensor element. The parameter sensor element is given a restorative movement in a direction toward its initial position, the extent of restorative movement being proportional to the units to be indicated. The restorative movement activates the parameter indicator. In a disclosed altimeter, the parameter sensor element includes an aneroid bellows and the parameter indicator is a dial provided with equally spaced graduations of altitude.

12 Claims, 5 Drawing Figures

PATENTED FEB 18 1975  3,867,680

INSTRUMENTATION SYSTEM CONTAINING A NULL SHIFTING MEANS

This invention relates to a method and apparatus for sensing and indicating a parameter, wherein a parameter sensing means is movable in response to changes in the parameter, and a parameter-indicating means is graduated in units which are non-proportionally related to the extent of movement of the sensing means.

Altimeters fall into the category of the invention, since they conventionally use an aneroid bellows for actuating an indicator device which has equally spaced graduations of equal increments of altitude above sea level. Most aneroid bellows expand proportionally to the ambient pressure. Since the change in pressure per vertical foot in altitude progressively diminishes as the altitude increases, the expansion of the bellows is a function of but is not proportional to its altitude.

At altimeter graduated in equally-spaced units of equal values of altitude cannot be operated directly by the movement caused by expansion of an aneroid bellows. Some means are required for translating the pressure-proportional law of the bellows to the altitude-proportional law of the indicator device. Such a change in law or translation has been accomplished in the past by means of mechanical levers and springs arranged between the sensor and indicator.

My earlier U.S. Pat. No. 3,612,881, which is incorporated herein by reference, discloses an instrumentation system which optically and photoelectrically senses the movement of one end of an aneroid bellows in response to pressure changes, and then moves the bellows to restore its pressure-movable end to its original position, so that the extent of movement required for such repositioning will be indicative of the extent of bellows expansion. This avoids the mechanical levers and springs, but does not produce a movement which is directly proportional to the units which are to be indicated, specifically vertical distance above sea level.

In one respect, the present invention constitutes an improvement over the apparatus and method disclosed in my previous Pat. No. 3,612,881; however, the principles of the present invention are useful with other systems which use movable parameter-sensing means and a parameter-indicating means which has its graduations non-proportionally related to the extent of movement of the parameter-sensing means.

According to the present invention, a parameter sensor has an initial, null or datum position. When the parameter changes, the sensor moves in response to such changes. A restorative movement is then given to the parameter sensor, but this restorative movement is only of a magnitude proportional to the change in value of the indicated parameter. This restorative movement is directly connected to the parameter-indicator which moves or is otherwise changed in an amount proportional to the change in the parameter.

According to the preferred embodiment of the invention, an altimeter utilizes an expansible chamber device such as an aneroid bellows which has a supported end and a pressure-movable end which moves with respect to the supported end in response to changes in the surrounding pressure. Means are provided to determine the location of the pressure-movable end of the bellows, and particularly any displacement thereof from its initial, null or datum position. When such changes occur, they are sensed and the support end of the aneroid bellows is moved by a restorative means, tending to restore the pressure-movable face to the datum position. In this embodiment, the invention resides in the improvement whereby the means are provided to shift the null position of the system, so that movement of the support end of the bellows is proportional to the change in altitude.

A preferred embodiment of the invention will now be discussed, with reference being made to the accompanying drawing wherein.

Figure 1:
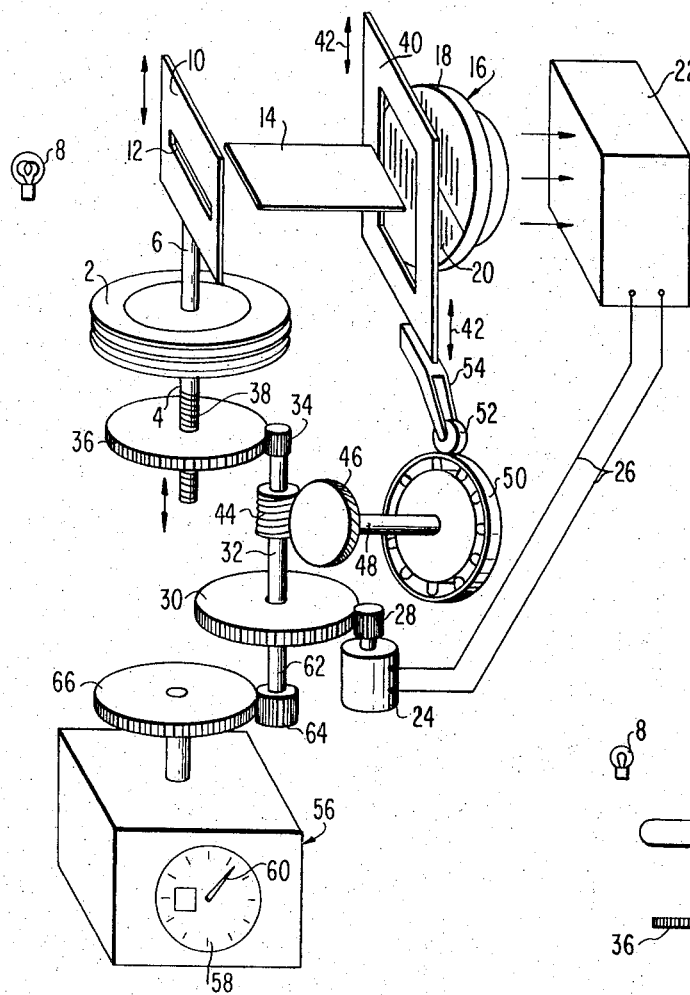
FIG. 1 is a diagrammatic illustration of an altimeter system embodying the invention.

In the pressure-sensing and altitude-indicating system shown in FIG. 1, there is an aneroid bellows 2 which is constructed in the usual fashion in order to expand and contract in response to changes in the ambient pressure. The lower face of the aneroid bellows is supported by a shaft 4, and the upper face of the bellows 2 is provided with a rod 6 which moves vertically in response to pressure changes which produce expansion and contraction of the bellows.

Movement of the upper face of the bellows 2 and the rod 6, is detected by a system of the type disclosed in the above-mentioned U.S. Pat. No. 3,612,881 which was granted on Oct. 12, 1971. It includes a lamp 8 or other illumination means which is directed on baffle 10, the latter being rigidly connected to the upper end of the rod 6 so as to be vertically movable in response to expansion and contraction of the bellows 2. A slot 12 or other light-transmissive area is provided in the baffle 10 to create a beam of light of roughly rectangular cross section. This beam may be split by the baffle 14 before arriving at the photosensitive cell 16 which has an upper element 18 and a lower element 20. These photosensitive elements 18 and 20 may be of various types. For example, they may be cells which convert light energy into an electrical current or they may be photoresistive elements whose electrical conductivities vary in accordance with the amount of light which strikes them. A device of the latter type is shown and may be a hermetically sealed dual element photoconductive cell of the type NO.C0705L/2 manufactured by Clairex Corporation of New York.

A conventional bridge circuit or other balance-analyzing circuit is contained in the housing 22 in order to detect any changes in the relative amount of light striking the photosensitive elements 18 and 20. When there is an unbalanced condition created by a greater amount of light striking one element than is striking the other photosensitive element, an error signal is generated to energize a servo motor 24 which is connected thereto by the conductors 26. The purpose of the circuitry and the servo motor 24 is to move the slotted baffle 10 to a position where equal amounts of light will strike the respective photosensitive elements 18 and 20. This movement is transmitted from the shaft of motor 24 by a drive train which includes a spur gear 28, a gear 30, shaft 32, spur gear 34 and a gear 36. The gear 36 is maintained at a constant elevation and is internally threaded to mate with threads 38 on the nonrotatable shaft 4, whereupon rotation of the gear 36 will cause vertical movement of the shaft 4, the bellows 2, the rods 6 and the baffle 10.

In my earlier Pat. No. 3,612,881, the disclosed system always returned the baffle which corresponds to baffle 10 to its initial position. The disadvantage of such a system is that the amount of movement of the various elements in the drive train is directly proportional to changes in pressure which is a function of but is not directly proportional to the altitude. This requires the use of non-uniform spacings between the graduations of the indicator or the use of springs or linkages for converting the pressure-proportional movement of the baffle 10 to the altitude-proportional movement of the elements of an indicator device.

According to the present invention, the bellows 2 and baffle 10 are not restored to their initial position, but are instead moved only in an amount which is directly proportional to changes in altitude. This is accomplished preferably by using a secondary baffle 40 which is supported in vertical guideways (not shown) and movable in the direction indicated by the arrows 42. When the secondary baffle 40 is centered with respect to the photosensitive cell 16, equal areas on the faces of each of the photosensitive elements 18 and 20 are exposed to the incident beam of light. However, when the secondary baffle 40 is displaced upwardly from its centered position, the exposed area of the lower cell 20 is reduced. This, of course, shifts the null position of the baffle 10, since a larger portion of the beam passing through the baffle 10 strikes the reduced area of the lower element 20, and a lesser area of the beam strikes the upper element 18 in order to establish a balanced condition in the circuitry which actuates the servo motor 24.

The vertical position of the secondary baffle 40 is a function of the vertical position of the bellows support shaft 4. This relationship exists because the secondary baffle 40 is positioned in response to movement of the drive train between the servo motor 24 and the bellows support shaft 4. A worm gear 44 on the shaft 32 meshes with a gear 46 which, through shaft 48, drives an adjustable cam 50. A roller cam follower 52 is connected by a bracket 54 to the secondary baffle 40.

The extent of movement of the secondary baffle 40 is determined by the adjustable cam 50 which has a plurality of amplitude-adjusting screws used for calibration. When the instrument is properly calibrated, the secondary baffle 40 will be positioned so that the vertical movement of the bellows supporting shaft 4 is directly proportional to changes in altitude as sensed by the pressure-sensing bellows 2. The altitude-indicating means may be of any type, and it is not necessary that it be a visually-observable indicating means; the indicating means may include an autopilot system or a transponder which has an altitude-indicating radio transmitter, for example. In the disclosed embodiment, it is designated 56 and includes a dial face 58 and a hand 60. These elements are driven by a shaft 62 which is driven by gears 64 and 66 connected to the drive train between the servo motor 24 and the bellows-supporting shaft 4.

Figure 2:
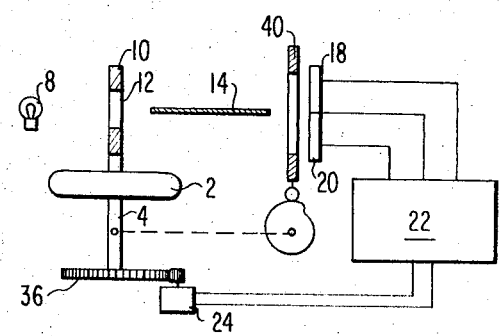
FIGS. 2, 3 and 4 illustrate the system of FIG. 1 and its initial null, displaced and shifted null positions, respectively.

The basic operation of the apparatus will now be described with reference to FIGS. 2, 3 and 4. In FIG. 2, the baffle 10 connected to the movable face of the bellows 2 is in a datum position whereby light from the lamp 8 will form a beam which passes on opposite sides of the beam splitter baffle 14, through the aperture in the secondary baffle 40 and against the faces of the photosensitive elements 18 and 20. In this position, which may be described as an initial null or datum position, equal amounts of light strike each of the photosensitive cells 18 and 20. The circuitry in the housing 22 is balanced and no error signal is created to actuate the bellows-positioning servo motor.

Figure 3:
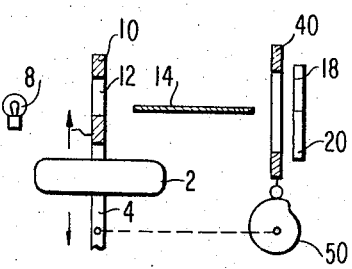
Figure 4:
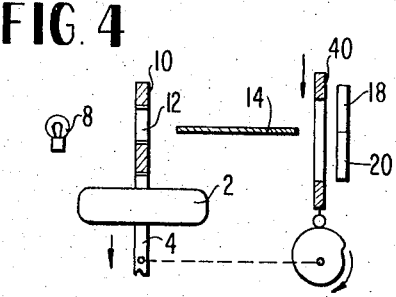

When the apparatus is exposed to a sudden increase in altitude which expands the bellows 2 to displace the baffle 10 upwardly, the condition shown in FIG. 3 exists. A greater amount of light strikes the upper photosensitive element 18 and less light strikes the lower photosensitive element 20. An unbalanced condition is created in the circuitry, generating an error signal which actuates the servo motor 24 to drive the bellows-supporting shaft 4, the bellows 2 and the baffle 10 downwardly.

At the same time the servo motor 24 is moving the baffle 10 downwardly, the adjustable cam 50 is rotated to move the secondary baffle 40 downwardly so that there is a larger exposed area of the lower photosensitive element 20 than of the upper photosensitive element 18. Since the system is designed to move the baffle 10 to a position where equal amounts of light will strike the two photosensitive elements, it will be appreciated that the null position has been shifted and baffle 10 will be moved downwardly toward but not quite so far as its initial null position illustrated in FIG. 2 so that equal cross-sectional areas of the light beam will strike the cells 18 and 20. This creates a new balanced condition, caused by the new position of baffle 40, in the sensing and servo system and, most importantly, it causes movement of the shaft 4 which is directly proportional to the change in altitude which is indicated on the device 56.

It will be appreciated that a number of quite different systems may use the principles of this invention. A temperature-sensing system may, in lieu of the bellows, use a bimetallic element whose expansion characteristics are not directly proportional to temperature, utilizing an indicator device provided with a temperature scale with uniformly spaced temperature graduations. Position-sensing systems may differ from the photosensitive system disclosed herein; for example, it may be possible to make the rod 6 of a ferrite material and project it into an electrical induction coil which has associated circuitry for creating an error signal and actuating the servo motor 24 when its position deviates from an established reference position. In such an arrangement, an element such as the adjustable cam 50 may be used to move the induction coil in amounts which will result in restorative movement of the shaft 4 through a distance which is proportional to the parameter being analyzed.

Figure 5:
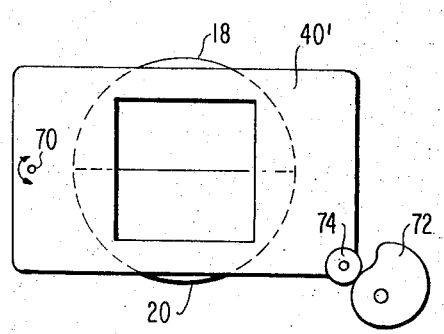
FIG. 5 shows a modified means for shifting the null position of the pressure-movable face of the bellows.

In the system shown in FIG. 1, it would be possible to dispose of the secondary baffle 40 and move the photosensitive cell 16 under the influence of the adjustable cam 50. In the alternative, the secondary baffle 40 may assume some other construction which is capable of creating a difference in the exposed areas of the respective photosensitive elements 18 and 20. Such an arrangement is shown in FIG. 5 which shows a baffle 68 which is pivoted at 70 in order to obscure portions of either the upper or lower photosensitive elements. The movement of the pivoted baffle 68 is produced by a cam 72, the shape of which must be determined by routine experimentation. The cam 72 rides on the cam follower roller 74 on the baffle. Of course, the cam 72 is directly driven by the drive train between the servo motor 24 and the bellows-supporting shaft 4.

In view of the many forms which the invention may assume, emphasis is placed on the fact that the invention is not limited only to the disclosed and discussed embodiments, but encompasses modifications and variations thereto which embody the principles set forth in the claims which follow.

I claim:

1. An instrument for sensing and indicating a parameter, comprising;
    a. a parameter-sensing means which includes:
        a first means movable in response to changes in the parameter,
        a second means for sensing changes in the position of the first means,
        said first and second means being initially positioned at a null position with respect to each other, and
        restorative means for relatively moving said first and second means to restore them to their null position;
    b. a parameter-indicating means changeable in response to movement of the restorative means; and
    c. shifting means for shifting the null position in response to movement of the restorative means, said shifting means producing movement of the restorative means which is proportional to changes in value of the parameter being indicated.

2. The instrument of claim 1 wherein the first means directs a beam of light on the second means, said second means including two photosensitive elements in the path of the beam of light, and the shifting means includes a light-interrupting means interposed between the first means and second means to change the ratio between the areas of the two photosensitive elements exposed to the beam of light.

3. The instrument of claim 1 wherein the first means is movable in response to changes in ambient pressure, and the shifting means is constructed to make the indicating means to move in proportion to altitude, whereby the instrument serves as an altimeter.

4. The instrument of claim 1 wherein the parameter-indicating means includes an altitude-indicating radio transmitter.

5. The instrument of claim 1 wherein the parameter-indicating means includes an autopilot.

6. An altimeter comprising;
    a. an altitude sensing means which includes an expansible chamber device having a first end movable in response to changes in pressure,
        change-sensing means for sensing changes in the position of the first end of the expansible chamber device,
        said first end and said change-sensing means being initially positioned at a null position with respect to each other, and
        restorative means for relatively moving said first end and said change-sensing means to restore them to their null position;
    b. an altitude-indicating means changeable in response to movement of the restorative means; and
    c. shifting means for shifting the null position in response to movement of the restorative means, said shifting means producing movement of the restorative means which is proportional to changes in altitude.

7. The altimeter of claim 6 wherein the change-sensing means includes means for generating a beam of light and a pair of photosensitive elements for receiving said beam of light, and the shifting means includes a light-interrupting means interposed between the beam generating means and the photosensitive elements to change the ratio between the areas of the two photosensitive elements exposed to the beam of light.

8. The altimeter of claim 6 wherein the parameter-indicating means includes an altitude-indicating transmitter.

9. The altimeter of claim 6 wherein the parameter-indicating means includes an autopilot.

10. A method of linearizing the output signal of a mechanical transducer having a movable member moved from a datum position in response to changes in a parameter to be sensed, comprising.
    a. indicating a datum value of the parameter on an indicating device;
    b. moving said movable member of the mechanical transducer from a datum position in response to changes in the parameter, the increments of movement of the movable member being disproportional to the corresponding increments of value of the changes;
    c. moving the movable member toward the datum position through a distance which is proportional to the change in value of the parameter, and
    d. changing the value of the parameter indicated on the indicating device in response to the movement of step (c).

11. The instrument of claim 1 wherein the shifting means includes means for adjusting the distance by which the null position is shifted for the respective positions of the parameter-indicating means, to permit calibration of the instrument.

12. The instrument of claim 6 wherein the shifting means includes means for adjusting the distance by which the null position is shifted for the respective positions of the altitude-indicating means to permit calibration of the altimeter.

* * * * *